United States Patent [19]

Busby, Jr. et al.

[11] 4,037,260
[45] July 19, 1977

[54] TAPE TIMER ERROR CORRECTOR CIRCUIT FOR TAPE RECORDER/REPRODUCERS

[75] Inventors: Edwin S. Busby, Jr., Menlo Park; Reginald W. Oldershaw, Los Altos, both of Calif.

[73] Assignee: Ampex Corporation, Redwood City, Calif.

[21] Appl. No.: 668,678

[22] Filed: Mar. 19, 1976

[51] Int. Cl.² .................... G11B 15/52; G11B 15/54
[52] U.S. Cl. ........................................ 360/73; 360/14; 360/70
[58] Field of Search .................. 358/8; 360/36, 70, 72, 360/73, 14

[56] References Cited

U.S. PATENT DOCUMENTS

| | | | |
|---|---|---|---|
| 3,772,468 | 11/1973 | Tatsuguchi | 360/73 |
| 3,836,756 | 9/1974 | Yammoto | 360/70 X |

Primary Examiner—Bernard Konick
Assistant Examiner—Donald E. McElheny, Jr.
Attorney, Agent, or Firm—George B. Almeida

[57] ABSTRACT

An error corrector circuit for correcting a tape timer in a video tape recorder/reproducer (VTR) having a multiple frequency control track, wherein a selected control track frequency is separated from the composite frequencies via commutating filter means capable of following frequency variations caused by variable tape speeds. The resulting filtered control track signal of selected frequency is phase compared with a tach clock signal of similar frequency obtained from the capstan tachometer. In the absence of slip, creep, tension variations, and other speed errors caused by playing the tape on different devices, there is no phase difference between the compared signals, which are thus phase locked together. Any phase deviations between the filtered control signal and the tach clock signal are detected and fed back to correct the tach clock signal so that it accurately represents the passage of tape past the VTR head means. A television frame rate pulse output derived from the corrected tach clock signal is fed to the tape timer of the VTR.

10 Claims, 5 Drawing Figures

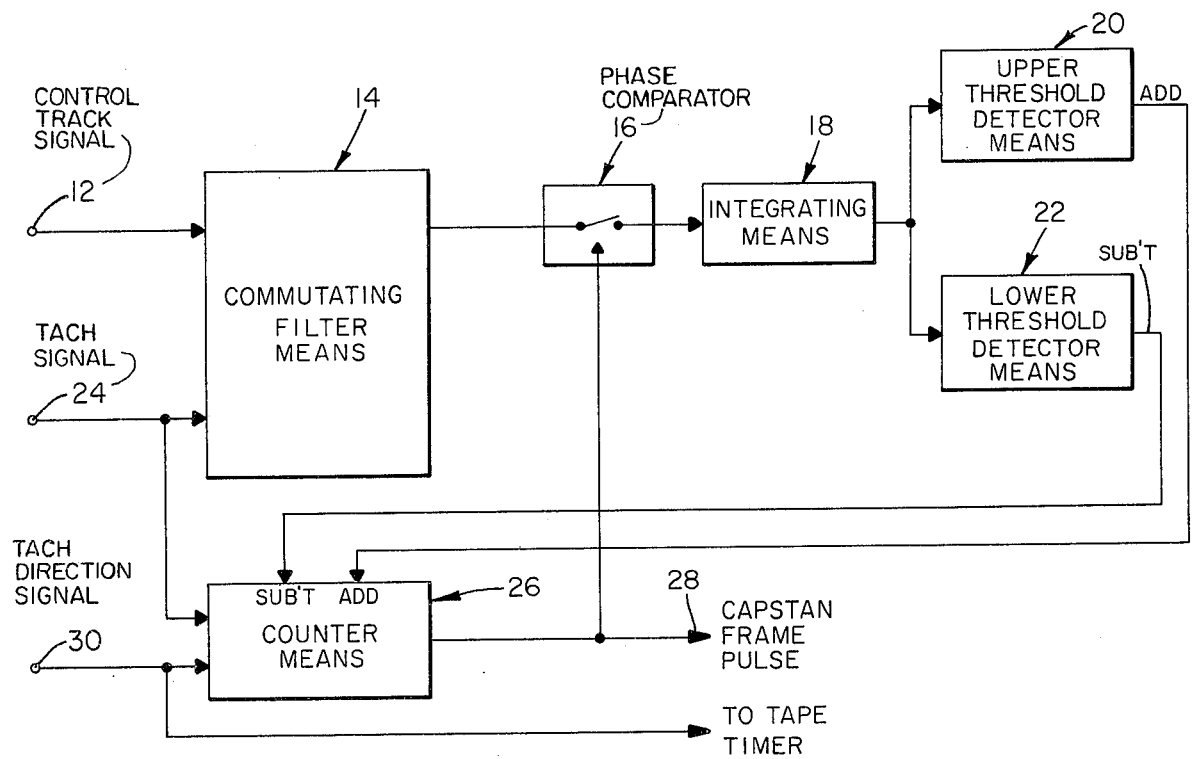
FIG_1
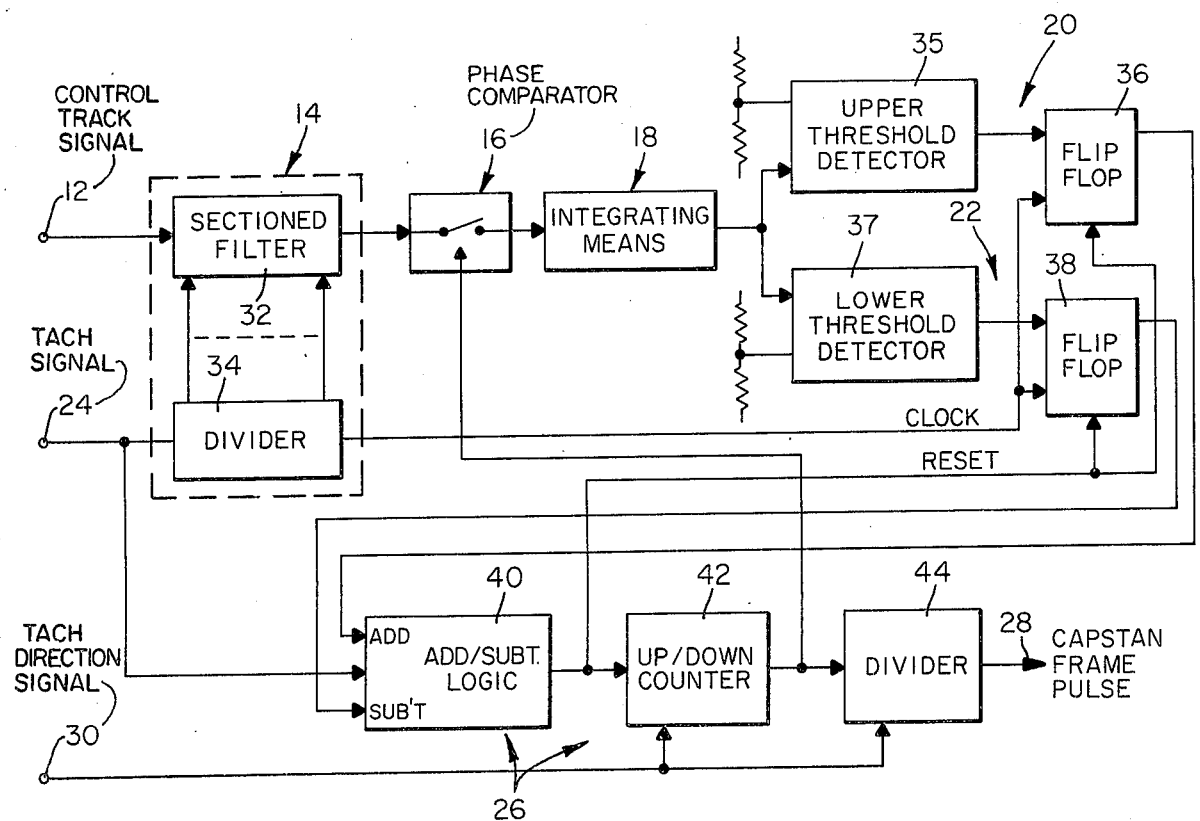
FIG_2

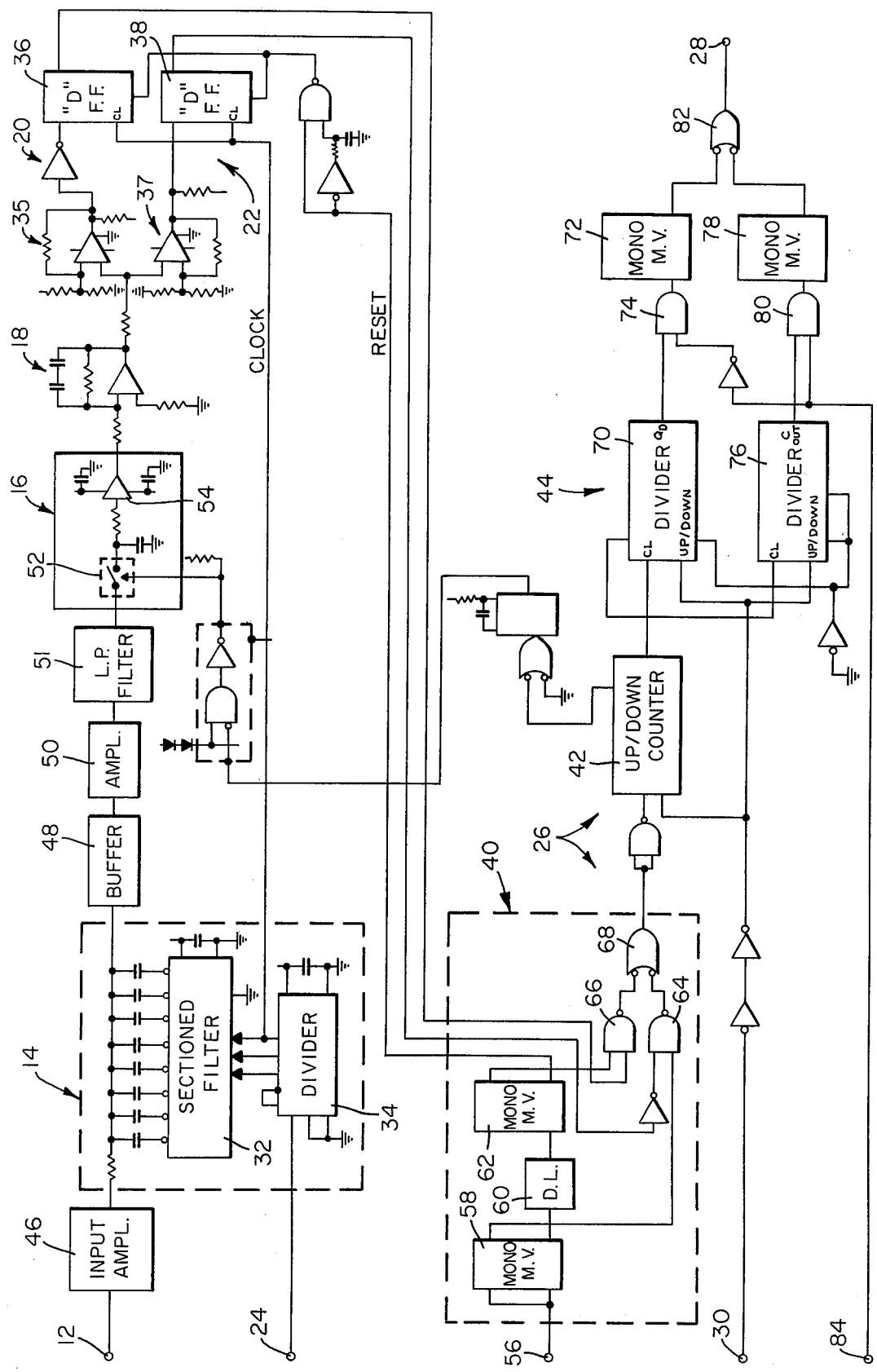
FIG_3

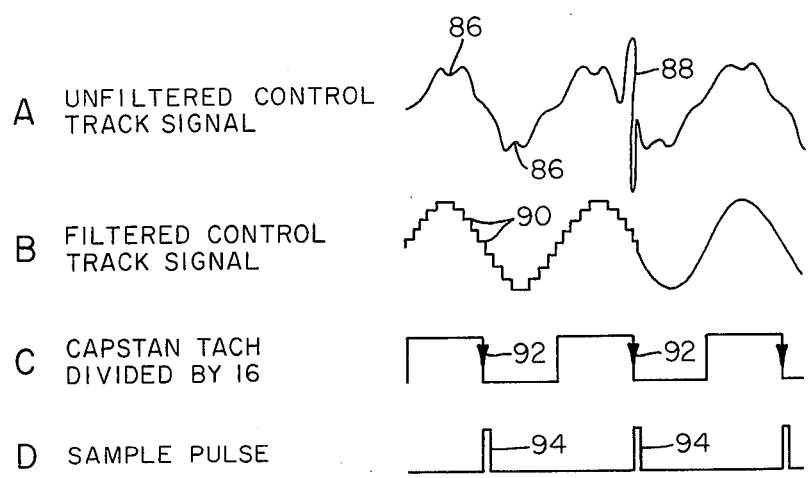
FIG_4
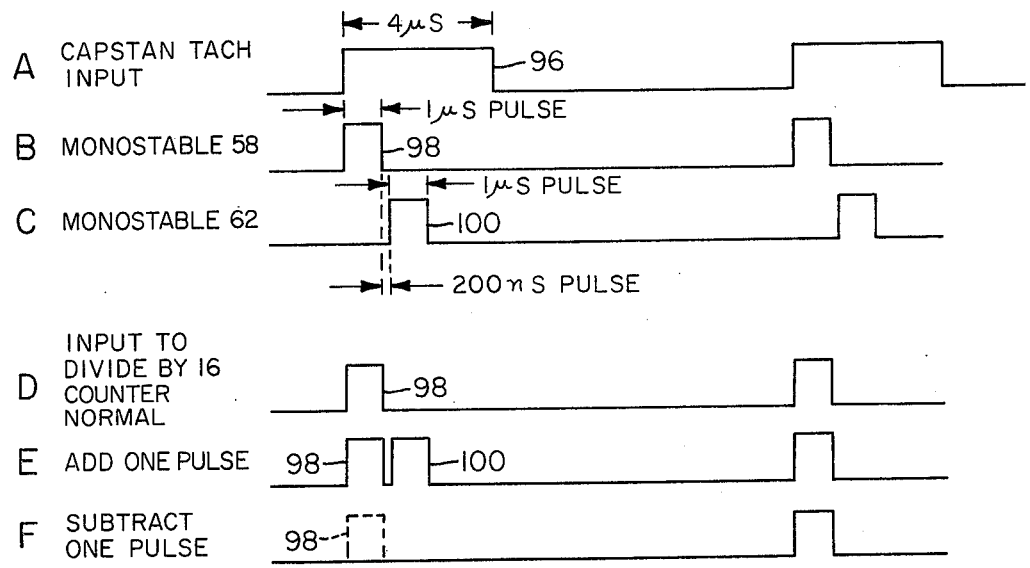
FIG_5

TAPE TIMER ERROR CORRECTOR CIRCUIT FOR TAPE RECORDER/REPRODUCERS

BACKGROUND OF THE INVENTION

1. Field

The invention relates to electronic tape timers for video tape recorder/reproducers (VTRs), and particularly to a correction circuit for providing frame rate pulses to a tape timer circuit of a quadruplex VTR, which pulses are a precise indication of the tape longitudinal position and movement relative to the head means, over the entire speed range of the VTR.

2. Prior Art

Tape timers are incorporated in video transport systems to accurately locate desired positions on the tape, and to continuously indicate the amount of relative elapsed time which has passed after starting the tape. The indications of tape position may be a measure of the time which has passed following the start of the tape transport at a tape reference point, or of the time remaining before a reference point is reached. To provide editing accuracies of the order of a frame video, very precise measurement of the longitudinal position of the tape relative to the record and reproduce magnetic head locations must be made.

To this end, various tape timer and corrector circuits are available in the art, wherein the components thereof are generally determined by the characteristics of the tape transport, and the degree of accuracy required by the particular application.

A basic tape timer utilizes a tachometer wheel coupled to rotate as the tape is transported thereover. Tachometer sensors of selected design provide pulses that are counted to provide information indicative of the length of tape which has passed the magnetic head location. The tach information is accordingly mechanically derived and its accuracy therefore depends upon maintaining a constant relationship between the number of tach pulses generated and the actual longitudinal length of tape transported past the magnetic head location. Tape slippage, creep, changes in tape stretching and transport tension, the fact that the tape is reproduced on different recorders than it was recorded on with differences in tension, capstan diameters and capstan surface slip coefficients, etc., causes changes in the relationship which, in turn, causes inaccuracies in the length of tape measured. Such mechanical tachometers have the advantage of providing continuous tach information without interruption.

A further tape timer system utilizes timing information recorded on the tape itself, which information is read from the tape as it passes the magnetic head location. Such a system circumvents the inaccuracies of the mechanical tachometer system since such recorded information accurately reflects the length of tape transported past the magnetic head locations. In video recorders, of the quadruplex type, a control track made up of a given standard of components, is recorded longitudinally along the tape length. For example, such a composite control track has two components; a sinusoidal component at the head rotational rate, and a frame pulse at the television frame rate, as directed by NTSC, PAL or SECAM formats. The control track pulse is thereafter reproduced as, for example, during the playback and or editing process, to provide accurate tape timing information at the frame rate.

Still further tape timers in the art provide a combination of the mechanical tachometer and control track systems of previous mention, to gain the advantages of both while circumventing the disadvantages of either. In this latter, more accurate system, the mechanical tachometer is generally employed as the principle source of tape timing information, while the control track pulse is employed to correct any deviations of the mechanical tachometer due to the inaccuracies caused by tape stretchage, creep, tension variations, differences between recorders, etc. To this end, some form of phase comparison is made between the information from the tachometer and the control track, which allows the tape timer system to correct the tachometer signals in response to the control track information.

The latter, more sophisticated system, is preferable for use in video recorder/reproducer systems when editing or splicing of information is to be performed, particularly when attempting to locate an edit to within accuracies of one frame of video. Heretofore, however, separate and expensive equipment have been required to provide editing to such accuracies, particularly in quadruplex video recorders, since the control track recorded on quadruplex systems is formed of multi-frequency signals and is thus difficult to extract precisely over the full range of operating speeds. For example, unlike some video recorders, the quadruplex VTR provides a standard control track which includes an unbiased 240 Hz signal recorded close to the saturation point of the tape thereby giving rise to severe third harmonic distortions of the order of 30 percent. In addition, the control track includes spaced frame pulses the period of which is dependent upon whether the system is employing the NTSC, PAL or SECAM recording format. It is very difficult to detect and extract with precise accuracy such a complex control track signal over the range of tape speeds encountered when shuttling tape rapidly from one position to another.

SUMMARY OF THE INVENTION

The invention corrector circuit for use with quadruplex VTR tape timers, provides means for accurately detecting the aforementioned complex control track, and for phase-locking via a closed loop, the tachometer pulses to the derived control track signal. To this end, a commutating filter means responsive to the capstan tach signal provides a precise, filtered control track signal of selected frequency, which in turn is fed to phase comparison means such as, for example, a sample and hold circuit. The capstan tach signal is divided down to a tach clock of frequency identical to that of the filtered control track signal and is used to clock the latter. A polarity-sensitive, phase error detecting means senses any phase deviations in the compared signals, and feeds the errors back to update the tach clock signal relative to the filtered control track signal. The resulting corrected tach clock is then used to provide a capstan frame rate pulse output of, for example, 30 Hz, which is then used to drive the tape timer system of the quadruplex VTR. As may be seen, the servo circuit of the invention automatically compensates for varying tape speeds, i.e., provides an accurate filtered control track signal over the full range of speeds from zero to full shuttle speed.

BRIEF DESCRIPTION OF THE DRAWINGS

FIGS. 1 and 2 are block diagrams illustrating an embodiment of the invention combination.

FIG. 3 is a detailed schematic of the embodiment of FIGS. 1 and 2.

FIGS. 4A-4D and 5A-5F are graphs illustrating the waveforms generated via the error corrector circuit at various points therealong.

DESCRIPTION OF THE PREFERRED EMBODIMENTS

The invention may be defined in terms of apparatus and method, wherein the method is understood by the description of the apparatus. Further, the invention is particularly described herein in relation to a quadruplex video tape recorder/reproducer (VTR) and employing specific components of the NTSC recording format. However, it is understood that the combination is applicable to tape timer systems in general wherein the control track recorded on tape, or on other flexible strips of material, is of a multiple frequency composition, or wherein a PAL and SECAM recording format is employed (FIG. 3).

Referring to FIG. 1, a standard multiple frequency composite control track signal of, for example, a quadruplex VTR, is introduced via input 12 to a commutating filter means 14 such as shown and described by way of example in FIGS. 2 and 3, and further in the articles in "ELECTRONIC DESIGN" Vol. 16, Aug. 2, 1974, pages 96-101, and Vol. 23, Nov. 8, 1974, pages 116-120. The commutating filter means 14 generates a filtered control track signal of 240 Hz (when at playback speed) which, in turn, is introduced to a phase comparison means 16. The means 16 may comprise a sample-and-hold circuit, or other network capable of making a phase comparison between two signals. An integrating means 18 for averaging the amplitude of the compared signals, is coupled to the phase comparison means 16, and thence to upper and lower threshold detector means 20, 22. The threshold detector means 20, 22 are adapted to generate "add" or "subtract" signals respectively, commensurate with the amplitude as well as the polarity of the averaged signal introduced to the detector means from the integrating means 18.

The capstan tachometer signal from the capstan (not shown) of the quadruplex VTR is introduced via input 24 to counter means 26, as well as to the commutating filter means 14, and provides a tach signal indicative of the rotation of the capstan as it transports the tape past the VTR heads. Thus the commutating filter means 14 is clocked via the tach signal, as further described infra. The counter means 26 is coupled to the phase comparison means 16, and provides a continuously corrected capstan frame pulse output via terminal 28 in response to the add or subtract signals from the threshold detector means 20, 22. Thus, if the tape is lagging the capstan tach, a subtract command is delivered to the counter means 26 via the lower threshold detector means 22 to subtract a pulse therefrom to re-phase the compared signals. If the tape leads the capstan tach, a pulse is added to re-phase the compared signals.

A tach direction sense signal is introduced to the counter means 26 via terminal 30 (as well as to the subsequent tape timer system, not shown) to account for the direction of tape travel.

FIG. 2 depicts further details of the error corrector circuit of FIG. 1, wherein like components are similarly numbered. The commutating filter means 14 is thus formed of an $n$-capacitor filter 32, and a divide-by-$n$ divider 34, wherein $n$ is the number of capacitors in the filter 32 as determined by design choice. The capacitors are sequentially connected via the commutating action of the divider 34 to form a low shunting impedance to all signals except those at or about 240 Hz. The resulting filtered control track signal is fed to the phase comparison means 16.

The upper and lower threshold detector means 20, 22 of FIG. 1 includes upper and lower threshold detectors 35, 37 and respective D-type flip-flops 36, 38. The latter function as a store to allow incrementing or decrementing the counter means 26 only one pulse at a time. The flip-flops 36, 38 are clocked via a clock which is 1/16 of the tach rate, derived from the divide-by-$n$ divider 34.

The counter means 26 includes add/subtract logic circuit 40 which receives the capstan tach signal of 3.84 kHz (at playback speed of 15 inches/second) (ips) or a 1.92 kHz tach signal (at 7½ ips playback speed). The 3.84 kHz tach signal is provided via a 1-times capstan tach at 15 ips, and via a 2-times capstan tach at 7½ ips (depicted in FIG. 3), but may also be provided by a doubler circuit, etc., coupled to generate the 3.84 kHz tach signal at both the 7½ and 15 ips playback speeds. The circuit 40 output is also used to reset the flip-flops 36, 38. An up/down counter 42 (which divides by 16 ± 1) is driven by the logic circuit 40 and generates a 240 Hz tach signal, which is fed to the phase comparison means 16 for comparison with the 240 Hz filtered control track signal. The output from up/down counter 42 is also introduced to the output terminal 28 via a divide-by-8 divider 44, which generates the 30 Hz frame pulse output for use in the tape timer of the VTR system. Note the error corrector circuit is herein described for use in a VTR employing the NTSC recording format. A PAL system would utilize a 4 kHz capstan tach signal, a 250 Hz filtered control track signal, and a 25 Hz frame pulse output whereby, accordingly, in the PAL system the divider 44 would be a divide-by-10.

It should be noted that the quadruplex VTR herein provides a 16:1 relationship between the capstan tach signal at input 24 and the control track signal at input 12, at the playback speed of 15 ips. That is, the head writes 240 Hz for the control track, wherein the tach signal is 3.84 kHz, or 16 times the control track. Thus, the divide-by-16 divider 34 and counter 42 provide the similar 240 Hz signals which are compared in the phase comparator means 16.

The invention error corrector circuit provides the advantage that, if the control track does not exist, the filtered control track is not fed to the integrating means 18. The latter averages a zero value, and the counter 42 neither increments or decrements, but keeps outputting the 240 Hz signal corresponding to the tach clock frequency. When the control track returns, the error corrector circuit brings the tach clock back in phase with the filtered control track signal.

On the other hand, in prior art systems employing a phase comparator to drive a voltage controlled oscillator, etc., when the control track disappears, the oscillator continues cycling at a frequency commensurate with the last tape speed. If the tape speed then changes prior to the return of the control track, the oscillator (which is still running at the last tape speed) could not accurately bring the tach clock back in phase with the control track.

FIG. 3 depicts in greater detail the schematic diagram of the error corrector circuit of FIGS. 1 and 2, wherein like components are similarly numbered. Thus the control track signal is fed via terminal 12 to the commutating filter means 14 via an input amplifier 46. The filtered control track signal is fed to a buffer 48 defined, for example, by a voltage follower circuit, thence to an amplifier 50, and to the phase comparison means 16 via a low pass filter 51. The latter has frequency characteristics which reject frequencies lying outside the bandpass of the control track signals to thus remove switching noise due to the commutating filter means 14. The phase comparison means 16 is herein formed, by way of example, of a sampling means 52 and a hold means 54, which together generate amplitudes proportional to any phase difference between the filtered control track signal and the tach clock introduced thereto from the up/down counter 42. The comparison means 16 could also be formed of a chopping circuit, etc., but the sample and hold means 52, 54 generates an output with less ripple, since the carrier is inherently filtered out. The integrating means 18, the upper and lower threshold detectors 35 and 37, and the flip-flops 36, 38 are shown in greater detail in the schematic, and provide the add and subtract signals introduced to the counter means 26.

Counter means 26 includes the add/substract logic circuit 40, shown in more detail in FIG. 3, which is fed a tach signal input via terminal 56. The 2-times tach clock is introduced to the add/subtract logic circuit 40 when 7½ ips playback speed is used, otherwise an unmodified tach clock is used at 15 ips playback speed. (Such as the tach clock at terminal 24.) The tach signal is specifically introduced to a monostable multivibrator 58, to a pulse delay circuit 60, and thence to a second monostable multivibrator 62. The monostable multivibrator 58 is further coupled to an AND gate 64, whose other input is the subtract signal from the flip-flop 38. The output of monostable multivibrator 62 provides the reset signal to the flip-flops 36, 38, every 16th pulse of the tach clock. The multivibrator 62 is also coupled to an AND gate 66, which also is coupled to the add signal from the flip-flop 36. AND gates 64, 66 are coupled to an OR gate 68 and thence to the up/down counter 42, whose output is thence introduced to the sampling means 52.

The up/down counter is further coupled to a divide-by-8 divider 70, which is coupled in turn to a monostable multivibrator 72 via an AND gate 74. The components 70–74 define in part the divider 44 of FIG. 2 when utilizing the NTSC 525-line format. A comparable circuit for the PAL/SECAM 625-line format employs a divide-by-10 divider 76, monostable multivibrator 78 and AND gate 80 respectively. The outputs from monostable multivibrators 72, 78 are coupled to OR gate 82, which provides the frame rate pulse output to terminals 28. The proper circuit and thus frame rate is selected via a 525/625 select input terminal 84 coupled to the AND gates 74, 80.

Input 30 provides logic levels commensurate with the forward or reverse direction of tape movement which, in turn, is coupled to the up/down counter 42 and the dividers 70, 76.

FIGS. 4A–4D and 5A–5F depict the waveforms generated from the tape and various points along the error correction circuit. Referring also to FIG. 2, FIG. 4A depicts the waveshape of the control track recorded on the tape, showing the 240 Hz signal, the third harmonic distortion 86 and the frame pulse 88. FIG. 4B shows the waveform of the filtered (240 Hz) control track signal generated by the commutating filter means 14. The quantization caused by the tach clocking is shown as stationary steps 90 in the waveform. FIG. 4C shows the waveform of the capstan tach divided down by 16 via counter means 26. The negative going edges 92 thereof are used to form a 70 μ second pulse 94 (FIG. 4D) that samples the filtered control track waveform FIG. 4B along its negative zero crossing. If the sample creeps up or down the waveform edge contiguous with the negative zero crossing, (FIG. 4B) then the averaged phase error is detected and the add or subtract pulse updates the counter means 26.

FIGS. 5A–F depict the waveforms generated in the area of the add/subtract logic circuit 40 based on the unmodified capstan tach input, shown in FIG. 5A. The 4 μ second tach pulse 96 fires the monostables 58, 62 to generate a pair of pulses 98, 100 respectively (FIGS. 5B, 5C) spaced apart via a 200 nanosecond delay 60. The pulses 98, 100 are clock and reset pulses for the up/down counter 42 and flip-flops 36, 38, and are also used for the add and subtract pulses. FIG. 5D shows the input pulse to the counter 42 when the tach clock is in phase with the filtered control track signal. FIG. 5E shows the combining of both pulses 98, 100 to provide the add signal to the up/down counter, while FIG. 5F shows deleting both pulses to provide the subtract signal thereto. Thus the first monostable 58 pulse appears continuously in the data stream, unless a subtract function is performed.

We claim:

1. An error corrector circuit for generating precise frame pulses for a tape timer circuit in a tape recorder/reproducer having a tape, a multiple frequency tape control track recorded thereon indicative of the precise transport of tape past head means, and a capstan tach for deriving a tach signal indicative of the rotation of a capstan against the tape, comprising the combination of;
    first means coupled to the control track and responsive to the capstan tach for generating a filtered control track signal of selected frequency at any speed of tape motion;
    second means disposed to receive the capstan tach signal for generating a capstan tach clock of the same frequency as that of the filtered control track signal and definitive of the frame rate pulses used to drive the tape timer circuit;
    phase comparison means coupled to receive the filtered control track signal to provide a phase comparison thereof with the tach clock; and
    third means coupled to the phase comparison means for detecting any phase deviations between the tach clock and the filtered control track signal and for correspondingly updating the second means and thus the frame pulses in response to the phase comparison.

2. The error corrector circuit of claim 1 wherein said first means includes commutating filter means formed of multiple capacitors which are sequentially connected via the capstan tach clock to exclude all but the selected frequency of the multiple frequency control track.

3. The error corrector circuit of claim 2 wherein the second means includes counter means responsive to the third means to update the pulse count of the counter means commensurate with the phase deviations to maintain phase lock of the tach clock to the filtered control track signal.

4. The error corrector circuit of claim 3 wherein the phase comparison means includes means for generating a voltage of amplitudes proportional to the phase deviations between the compared signals.

5. The error corrector circuit of claim 4 wherein the third means includes fourth means for detecting the voltage amplitudes generated via the phase comparison means relative to selected upper and lower threshold levels, to selectively introduce to the counter means add or subtract signals commensurate with the degree and polarity of the phase deviations.

6. The error corrector circuit of claim 5 wherein the counter means includes add/subtract logic means and an up/down counter; wherein the fourth means includes integrator means coupled to the phase comparison means, and threshold detector means coupled to the integrator means and including the selected upper and lower threshold levels, wherein voltage amplitudes greater than the upper threshold level generate the add signal and voltage amplitudes less than the lower threshold level generate the subtract signal.

7. The error corrector circuit of claim 6 wherein said up/down counter is updated in response to the add or subtract signals delivered via the add/subtract logic means, said counter means further including divider means coupled to the up/down counter for generating the frame rate pulses used to drive the tape timer circuit.

8. A method for correcting tape position errors in tape metering devices used in tape recorder/reproducers, wherein the tape is moved longitudinally by a drive mechanism past tape head means at variable tape speeds, and wherein a standard control track formed of multiple frequency signals is recorded longitudinally on the tape, comprising the steps of:

generating a tach signal from the drive mechanism;
extracting a selected frequency signal from the control track in response to the tach signal to define a filtered control track signal representing the position of the tape relative to the tape head means at any tape speed;
comparing the phase of the filtered control track signal with that of the tach signal to detect any phase deviations therebetween; and
selectively updating the tach signal commensurate with the phase deviations to generate a timing output indicative of the precise longitudinal position of the tape relative to the tape head means.

9. The method of claim 8 wherein the step of extracting further includes sequentially connecting a plurality of capacitors via the tach signal to exclude all but the selected frequency signal of the control track.

10. The method of claim 9 further including the steps of:
establishing selected upper and lower threshold levels;
detecting any value of phase deviations which exceed the upper threshold level or decrease below the lower level; and
generating an add signal if the phase deviation exceeds the upper level, and a subtract signal if it decreases below the lower level, to update the tach signal relative to the filtered control track signal.

* * * * *